Patented Apr. 26, 1932

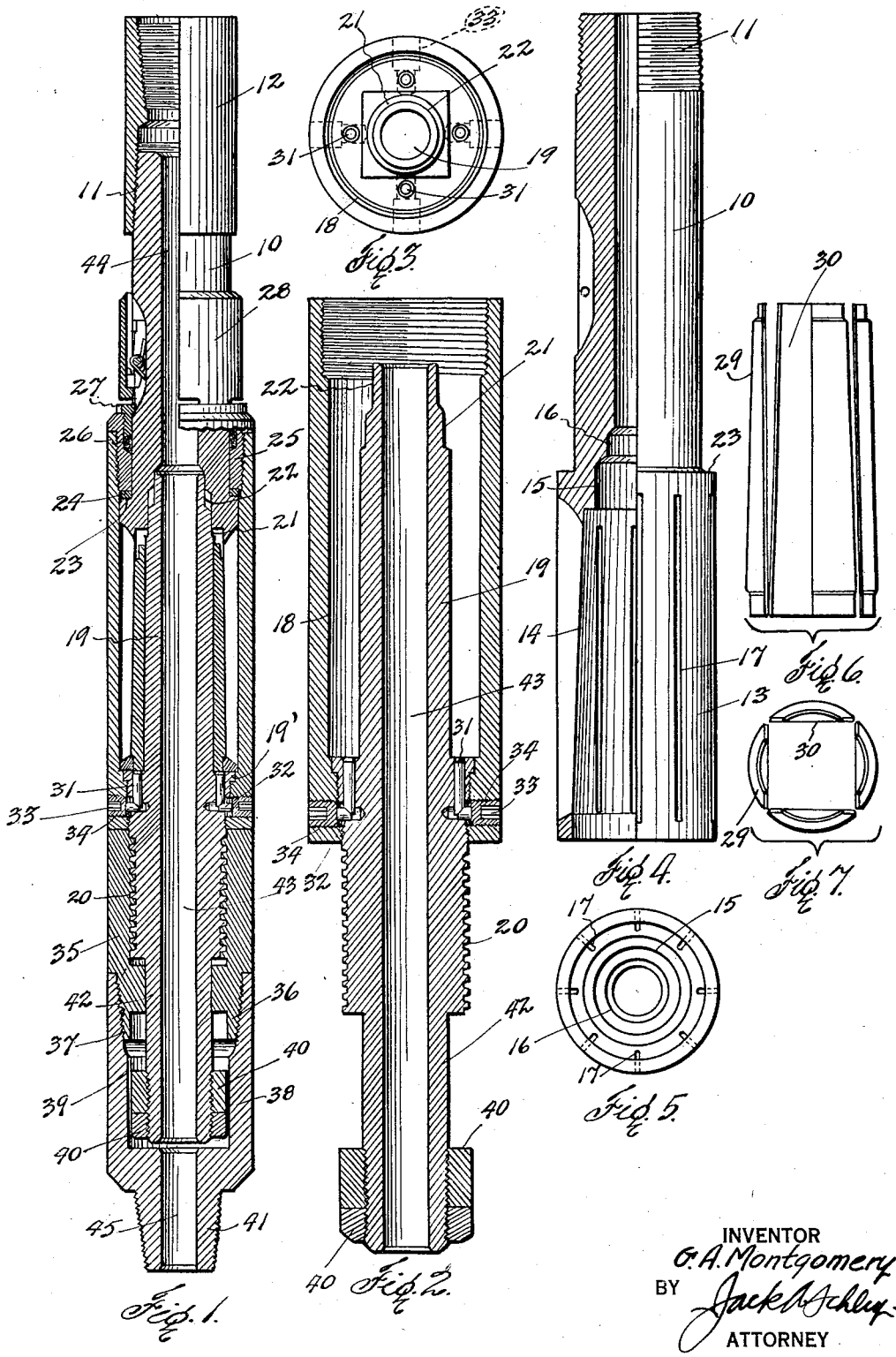

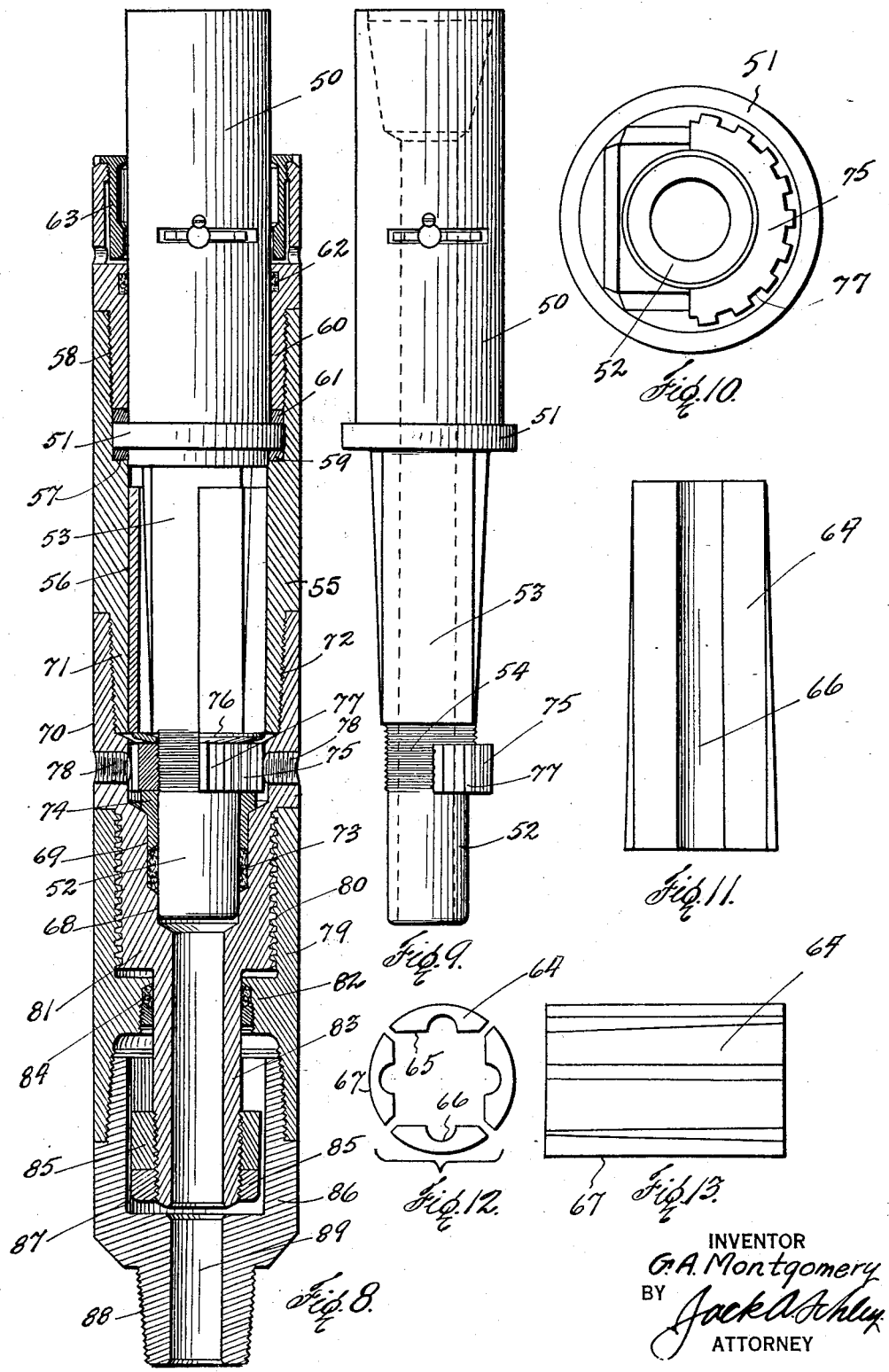

1,855,556

UNITED STATES PATENT OFFICE

GUSTAVUS A. MONTGOMERY, OF DALLAS, TEXAS

TORSION AND COUPLING CONTROLLING DEVICE

Application filed July 9, 1927. Serial No. 204,579.

This invention relates to new and useful improvements in torsion and coupling controlling devices for well drill stems.

The object of the invention is to provide certain improvements in torsion and coupling controlling devices such as are illustrated in my co-pending application Serial No. 201,077 June 24, 1927.

One of the objects of the invention is to provide a device of the character described equipped with means for contributing rotary motion from the driving member to the driven member and including longitudinally disposed expanding clutch members maintaining frictional contact until the torsion of the drill stem overcomes the static friction.

Another object of the invention is to provide a device of the character described particularly designed to give maximum friction contact surfaces in a limited space.

A further object of the invention is to provide a plurality of longitudinal clutch shoes and means for adjusting said shoes longitudinally to vary the static frictional contact, thus enabling the operator to set the device to yield at any predetermined point at which it may be desired to have the driving member rotate independently of the driven member.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a device constructed in accordance with the invention, partly is section and partly in elevation, Fig. 2 is a vertical sectional view of the driven member, Fig. 3 is a plan view of the same, Fig. 4 is a view of the driving member partly in elevation and partly in section, Fig. 5 is an underside view of the same, Fig. 6 is an elevation of the clutch shoes, one of the shoes being cut away, Fig. 7 is a plan view of the same, Fig. 8 is a longitudinal sectional view of another form in which the invention may be carried out, Fig. 9 is an elevation of the driving member with half of the adjusting nut omitted, Fig. 10 is an underside view of the same, Fig. 11 is an enlarged view of one of the shoes, Fig. 12 is a plan view of the four clutch shoes, and Fig. 13 is a side view of the same.

In the drawings the numeral 10 designates a tubular shank having a tapered screw-threaded upper end 11 for screwing into a coupling 12. The shank forms part of a driving member and has an enlarged cylindrical bushing 13 depending therefrom. The bushing has an upwardly tapered bore 14 having superposed counter bores 15 and 16, respectively connecting its upper end with the bore of the shank. The bushing is also provided with longitudinal narrow slots 17, whereby it is made flexible.

The bushing has its lower end open and also has a turning fit in the barrel 18 of a driven member. A mandrel 19 is screwed through the bottom of the barrel, fine threads being used to avoid easy detachment. The mandrel has an annular flange 19' countersunk in the bottom of the barrel above the fine threads. The said mandrel extends into the barrel and has a screw-threaded shank 20 below the barrel. The mandrel forms part of the driven member.

The mandrel within the barrel is square, but has annular reduced and shouldered portions 21 and 22, respectively, engaging in the counter bores 15 and 16. Packing may be placed in the counter bore 15. The upper end of the bushing 13 forms an annular shoulder 23 for receiving a thrust ring 24 held by a nut 25 screwed into the upper end of the barrel, whereby the parts are held together. The nut has a packing ring 26 in its upper portion surrounding the shank 10 and held by a follower 27. A gong 28 similar to that shown in my co-pending application Serial No. 201,077, June 24, 1927 is carried by the follower.

Longitudinal friction-clutch shoes 29 are interposed between the mandrel 19 and the surface of the bore 14. These shoes have flat inner sides 30 (Fig. 7) while their outer faces are curved to fit the bore 14 of the bushing. Owing to the flexible nature of the bushing the shoes, when wedged between the mandrel and said bushing, will expand the latter into frictional contact with the barrel 18.

For adjusting the shoes and thereby controlling the statical friction contact, vertical pins 31 are mounted to slide in the mandrel and support the shoes. The lower ends of the pins are beveled and rest upon the inner beveled ends of plungers 32. Screw plugs 33 inserted in apertures 34 in the barrel 18 engage the plungers and adjust the pins vertically. This clutch arrangement provides a maximum friction contact.

For taking up the back-lash in the drill stem a coupling 35 is screwed into the shank 20 of the mandrel and this coupling has a tapered screw-threaded pin 36 at its lower end for engaging in the socket 37 of a nipple 38. The nipple has a chamber 39 for receiving the stem 42 of the mandrel on which are screwed a pair of nuts 40. The nipple has a screwed coupling pin 41 at its lower end. An axial bore 43 extends down through the mandrel, being connected with the bore 44 of the shank 10 and the bore 45 of the nipple.

In drilling practice, the following would take place: The driller would feed the drill to the formation in his accustomed manner, and eventually crowd the drill so much that the resistance at the drill points equals the adjusted statical friction between the driving and driven members of the device. During this heavy torque on the drill pipe or stem, a definite proportional distortion has taken place in the drill pipe. In a long drill stem the twist or torque of the drill stem may amount to as much as a complete rotation or even more. Still, the distortion may be less than the force required to overcome the static friction limit. In other words, the drill pipe has a certain amount of "springiness". Suddenly the drill strikes a crevice in the formation, and the drill's rotation is immediately and violently arrested or stopped. The drill pipe having been under a maximum safe torque, continues to rotate in its upper part, but has become solidly seized by the drill at the lower end.

Remembering that the rotary machinery has excess of power over that required to twist off the drill pipe, it follows that as soon as the drill stem becomes anchored at its lower end, and the full power of the rotary machinery continues to supply torsion to the upper end, the moment will come when either the drill stem will twist off or, as is here intended to happen, the friction surfaces of the barrel 18 will suddenly slip on the outer or clutching surface of the bushing 13, as will also happen between the clutch faces of the shoes 29 and the bore 14. Now, according to the laws of friction, the kinetic friction is appreciably less than the static friction. It is then natural that, as soon as the friction members slip, the torque on the drill pipe is immediately halved or nearly so. At the moment of the beginning of the slippage, the drill stem has stored energy proportional to the torsional distortion within the elastic limit and exactly equal to the static friction of the mechanism.

As soon as slippage takes place, that fraction of the stored torsional energy which exceeds the kinetic friction of the contacting surfaces is immediately released, and manifests itself in a violent reversed rotation, which is greatest in the extreme upper end of the drill stem and gradually lessens until at the point where the lower stem becomes anchored, the reverse rotation is nil. When the stored energy has spent itself in back-lash the torsional distortion in the drill pipe becomes equal to kinetic friction in the friction mechanism. The rotary machinery may then continue to run without over-stressing the drill stem. However, as soon as slippage takes place the gong 28 is sounded.

Upon hearing the gong, or otherwise observing that the friction members are slipping, it then becomes the duty of the driller to stop rotating and lift the drill from the well bottom. At the moment when the drill becomes released from its anchorage the residue of the stored torsional energy in the drill stem, which is equal to the kinetic friction in the friction mechanism, becomes released and is spent in a violent reverse turning, or as it is called by drillers, back-lash. This back-lash is at times so violent that by its momentum the loosest screwed together joint in the drill stem unscrews and drops into the well bore. To avoid such a calamity, the coupling 35 with the shank 20 and the nipple 38 are provided. These parts have sufficient driving qualities when screwed up, but readily unscrew.

It will be seen that when the drill stem is lifted and the drill released, the coupling 35 will begin to unscrew from the shank 20. It is assured that even the most violent back-lash or reverse rotation will be taken up before the nuts 40 engage the coupling. The parts are so arranged that a sufficient number of threads will remain in mesh to support the pendant load. Upon releasing the bit and neutralizing the back-lash, the driller may renew boring by merely lowering the stem and drill into the bottom of the well. The unscrewing preventer is then screwed home by the well drilling rotation.

In Figs. 8 to 13 inclusive, I have shown another form in which the invention may be carried out. A tubular shank 50 has an annular collar 51 and a depending mandrel 52. The upper portion of the mandrel has four, more or less, panels 53 inclined upwardly and outwardly. Below these panels fine screw threads 54 are provided.

The shank and mandrel form a driving member and fit in the barrel 55 of a driven member. The barrel has a bore 56 which has a shoulder 57 at its upper end and a counter bore 58. A thrust ring 59 resting on the shoulder supports the collar 51 and a plug 60 confines a second thrust ring 61 on the collar. The plug is screwed into the upper end of the barrel and carries a packing 62 surrounding the shank. The plug supports a gong 63 in its upper portion similar to that in co-pending application Serial No. 201,077 June 24, 1927.

Longitudinal friction clutch shoes 64 are wedge shaped with flat inner faces 65 to fit in the panels 53. Each shoe has a longitudinal central groove 66, whereby it is reduced in thickness and made more flexible transversely. The outer face 67 of each shoe is curved to fit the bore 56 and frictionally contact therewith.

The lower end of the mandrel 52 is cylindrical and fits in a socket 68 at the bottom of a counter bore 69 of a sleeve 70. The barrel 55 has a tapered screwed pin 71 at its lower end engaged in a socket 72 at the top of the sleeve. A packing 73 is held in the counter bore by a follower 74. An adjusting nut 75 mounted on the threads 54 of the mandrel supports a dished spring washer or ring 76 supporting the shoes 64.

The nut has notches 77 for receiving a tool inserted through openings 78 in the sleeve, whereby said nut may be rotated to raise or lower the shoes 64 and thus vary the frictional contact. The spring ring 76 will resiliently sustain the shoes. By the turning of the plug 60 the static friction of the rings 59 and 61 is adjusted. The follower 74 acts as a lock for the nut 75.

For taking up back-lash in the drill stem a coupling 79 is provided and this coupling is formed with an internally screw-threaded socket 80 for receiving the screw-threaded shank 81 of the sleeve 70. The coupling has an annular internal collar 82 snugly receiving the stem 83 of the shank. A packing ring 84 seated in the collar embraces the stem.

A pair of nuts 85 on the lower end of the stem limit the unscrewing and downward movement of the coupling. A nipple 86 screwed into the bottom of the coupling has a chamber 87 for receiving the nuts when the coupling is screwed up. A screw-threaded pin 88 is provided on the bottom of the nipple for screwing into the drill stem (not shown). An axial bore 89 extends through the nipple and with the other bores provides a continuous fluid conductor through the center of the device. The packing ring 73 and the packing ring 82 provide against leaks and the loss of fluid pressure.

It is believed the operation will be clear from the preceding description. It might be added that in this form the static friction is increased by the rings 59 and 61 and the contact surfaces are nearly as effective as in the first form.

Various changes in the size and shape of the different parts, as well as modifications and alterations, may be made within the scope of the appended claims.

What I claim, is:

1. In a device of the character described, an expansible driving member, a driven member, an extension carried by the driving member and extending into the driven member, and friction clutch shoes disposed within the driving member to engage the driven member and extending longitudinally thereof.

2. In a device of the character described, an annular driven member, a driving member extending into the driven member, friction clutch shoes separate from the driving and driven members and disposed intermediate thereof, and means upon one member for adjusting said shoes axially of both members to vary the static friction without varying the lengthwise axial relationship of the driving and driven members with respect to each other.

3. In a device of the character described, a central mandrel, elongated clutch shoes surrounding said mandrel and held against rotation thereby, a driving member enclosing said shoes, and a driven member connected to said mandrel, the shoes contributing rotation from the driving member to the driven member, said shoes having friction faces permitting slipping under an overload.

4. In a device of the character described, a central mandrel, elongated clutch shoes surrounding said mandrel and held against rotation thereby, a driving member enclosing said shoes, a driven member connected to said mandrel, the shoes contributing rotation from the driving member to the driven member by expansion of the driving member, said shoes having frictional faces permitting slipping under an overload, and means for longitudinally adjusting the shoes.

5. In a device of the character described, an expansible driving member, a driven member receiving the driving member, a clutching member having longitudinally inclined faces within the driven member, and longitudinal friction clutch shoes engaging said faces and the interior of the driving member for contributing rotary motion from the driving member to the driven member.

6. In a device of the character described, a cylindrical expansible driving member, a driven member into which the driving member telescopes, and elongated friction clutch shoes carried by angular faces of the driven member and within the driving member and frictionally engaging the driving member.

7. In a device of the character described, a driving member, a driven member having annular walls between which the driving member telescopes, elongated friction clutch shoes disposed within the driving member and frictionally engaging with the interior thereof and the inner annular wall, and means at the base of said walls for adjusting said shoes to regulate the frictional contact with said member.

8. In a device of the character described, a cylindrical driving member, a driven member having an annular space into which the driving member extends means for retaining said members in the same lengthwise axial relationship, one of said members having an elongated gradually inclined clutching surface, and elongated clutching shoes separate from said members and provided with gradually inclined longitudinal faces axially adjustable in engagement with the abutting faces of each member.

9. In a device of the character described, a cylindrical driving member, a driven member having an annular space into which the driving member extends, one of said members having an elongated gradually inclined clutching surface, elongated clutching shoes separate from said members and provided with gradually inclined longitudinal faces axially adjustable in engagement with the abutting faces of each member, and means carried by one member for engaging an end of the shoes to axially adjust them within the driving member.

10. In a device of the character described, a driven member, a driving member, both members having means for connecting in a drill stem, the driving member having an extension extending into the driven member, the driving member having inclined clutching surfaces within the driven member, elongated clutch shoes carried within the driven member and having inclined faces engaging the surfaces of the driving member, adjusting pins supporting said shoes, and means for shifting said pins.

In testimony whereof I affix my signature.

GUSTAVUS A. MONTGOMERY.